United States Patent [19]
Asinovsky et al.

[11] 4,356,527
[45] Oct. 26, 1982

[54] VALVE ARRESTER

[76] Inventors: Erik I. Asinovsky, 16-ya Parkovaya ulitsa, 49, korpus 1, kv. 78; Anatoly A. Afanasiev, ulitsa Shosseinaya, 10, kv. 137; Evgeny P. Pakhomov, Yakhromskaya ulitsa, 3, korpus 2, kv. 30, all of Moscow, U.S.S.R.

[21] Appl. No.: 265,817

[22] Filed: May 21, 1981

[51] Int. Cl.[3] .............................................. H02H 9/04

[52] U.S. Cl. .................................. 361/134; 361/130; 361/137; 315/36; 313/325

[58] Field of Search ............... 361/134, 137, 138, 130, 361/128, 126, 117; 313/231.1, 231.21, 325, 306; 315/36, 35

[56] References Cited

U.S. PATENT DOCUMENTS

Re. 24,915 12/1960 Pittman ......................... 313/231.21
2,591,370 4/1952 Nelson et al. .................. 361/130 X
2,913,626 11/1959 Bislin ............................. 361/134 X
3,019,367 1/1962 Kalb ............................... 361/134 X
3,611,045 10/1971 Sakshaug ........................... 361/134
4,052,639 10/1977 Cunningham .................... 315/36 X

*Primary Examiner*—Patrick R. Salce
*Attorney, Agent, or Firm*—Fleit & Jacobson

[57] ABSTRACT

A valve arrester comprises a serial arrangement which includes at least one nonlinear resistor and spark gaps implemented as arcing horns which are housed in slit-type arc extinction chambers whose walls are made of an electric insulation material and form a single helical blade. The latter is arranged on a central cylindrical member and adapted to produce a single helical arc which is formed from arcs struck during the arrester breakdown in the spark gaps, said arcs being joined together during their movement.

2 Claims, 3 Drawing Figures

VALVE ARRESTER

FIELD OF THE INVENTION

The invention relates to gap arresters generally used for the protection of power networks from overvoltages, and more particularly to valve arresters.

The disclosed valve arrester is used for the protection of electric equipment and a.c. and d.c. power networks from overvoltages.

DESCRIPTION OF THE PRIOR ART

A valve arrester should have a sufficient carrying and arc extinction capacity so as to allow for quick diversion to ground of an excessive charge that arises in the network under protection, for example, due to a lightning stroke, thereby limiting the surge impulse level and duration. After the removal of the surge, the arrester should provide for quick extinguishing of the follow current that passes through it and also for the recovery of the electric strength of its spark gaps.

Known in the art are valve arresters comprising series-connected spark gaps in the form of arcing horns and nonlinear resistors (cf. a book by D. V. Shishman et al. entitled "High-voltage Valve Arresters", Energiya Publishers, Leningrad, 1971, pp. 14–28, 146–177, in Russian). The spark gaps in the known valve arresters are many and varied, while means for the extinction of the arc produced by the follow current that arises in the arresters after their breakdown may be classed as to the character of the arc as follows: immovable arc; rotating arc; split arc; self-blowing arc; and extending arc.

The requirements imposed on the operating characteristics of the protection apparatus of the protection apparatus of electric installations are continuously increasing. Therefore the constructors of valve arresters seek to decrease the level and duration of the overvoltage impulse in the network under protection and thereby increase the arrester carrying capacity, which is defined as the value of the discharge current passing through the arrester during the time of the overvoltage impulse, and increase the arrester arc extinction capacity as well.

A most effective method that provides for greater arc extinction capacity of arc gaps is the magnetic blow-out method in which the arc tends to lengthen due to electromagnetic interaction between the arc current and the applied magnetic field.

There is a valve arrester having voltage-limiting spark gaps and operating on the extending arc principle (cf. the U.S. Pat. No. 3,611,045, cl. 317-74, 1972). It comprises a serial arrangement of at least one nonlinear resistor and spark gaps implemented as arcing horns, which are housed in slit-type arc extinction chambers having its walls made of an electric insulation material.

In this arrester, after the breakdown, the arc is extended from the arc gap and moves over the arcing horns due to electromagnetic interaction between the arc current and the magnetic field produced by series-connected magnetic blow-out coils. Each spark gap of the arrester is housed in its own flat slit-type arc extinction chamber made of an electric insulation material. Connected in series with the spark gaps is an additional nonlinear resistor which is designed to limit the follow current basically at the time of the breakdown of the spark gaps when the present total resistance of the arcs is small. Since the volt-ampere characteristic of the additional resistor is nonlinear, a greater carrying capacity of the arrester is attained.

In the known valve arrester, the arc extinction capacity is limited by the value of lengthening the arcs in the flat arc extinction chambers. Moreover, the magnetic blow-out coils requires more complicated circuit and design features of the arrester.

SUMMARY OF THE INVENTION

It is an object of the invention to provide a valve arrester having a large arc extinction capacity.

It is another object of the invention to provide a valve arrester whose construction and electric circuit are simple.

There is provided a valve arrester comprising a serial arrangement which includes at least one nonlinear resistor and spark gaps implemented as arcing horns which are housed in slit-type arc extinction chambers whose walls are made of an electric insulation material, in which valve arrester, according to the invention, said walls are implemented in the form of a single helical blade arranged on a central cylindrical member and adapted to produce a single helical arc which is formed from arcs struck in the spark gaps during the arrester breakdown, said arcs being joined together during their movement, the arcing horns being situated between the turns of said helical blade, assuming a helical space orientation, and being affixed to the surface of the central cylindrical member.

Advantageously, said nonlinear resistor should be inserted between the adjacent spark gaps and is shunted at the point in time when a single arc is formed, thereby providing for an increase in the arrester carrying capacity.

The disclosed valve arrester has, therefore, greater arc extinction capacity. Owing to the fact that the arcs occupy a smaller space and the nonlinear resistor takes up a smaller load, the valve arrester offers simpler design and decreased overall dimensions.

BRIEF DESCRIPTION OF THE DRAWINGS

The invention will now be described in more detail, by way of example, with reference to the accompanying drawings, in which:

Referring to FIG. 1, the valve arrester of the invention comprises arc extinction chambers 1 (FIG. 1) of its spark gaps which have their walls implemented in the form of a single helical blade 2 arranged on a central cylindrical member 3. Thus the arc extinction chambers form together a single helical cavity so that a single helical slit is provided for all spark gaps of the arrester. The central cylindrical member 3 is hollow and the blade 2 on the surface thereof has the lead of its helix equal to λ, the latter being in the range from 0.5 to 2 cm. The member 3 and the blade 2 are made of an electric insulation material such as polysulfone carbonate, cast polyethyleneterephthalate resin by using casting or stamping method. The blade 2 can also be composed of separate components which are joined together.

Figure 1:
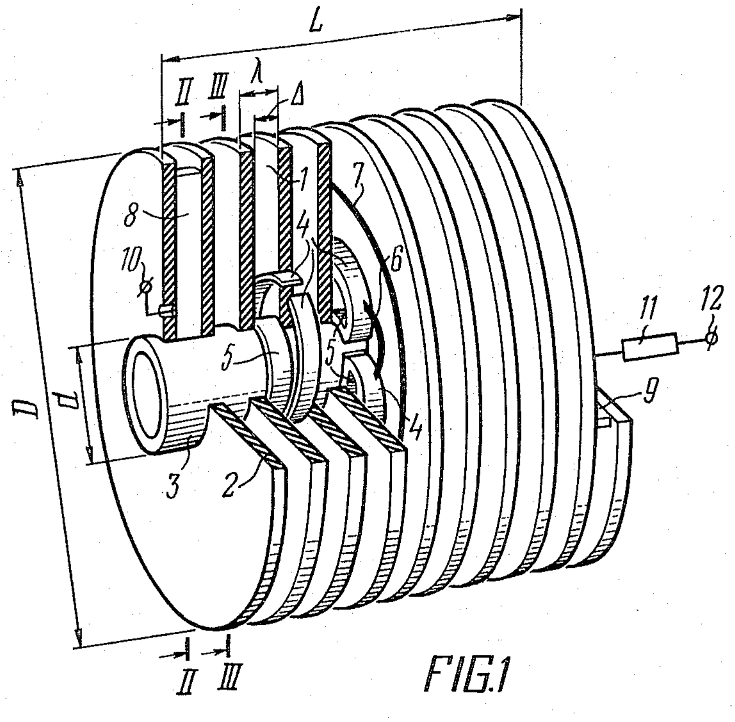
FIG. 1 is a diagrammatic dimetric partially sectioned representation of a valve arrester, according to the invention.

The width λ of the arc extinction slit takes its value in the range from 1 to 8 mm depending on the rated value of the follow current through the arrester. The thickness of the helical blade 2, which is equal to the difference λ-Δ, depends on the associated fabrication process characteristics and on the rated service life of the valve arrester; this thickness may be in the range from 2 to 10 mm.

The formulas below give the external, D, and the internal, d, diameters of the helical cavity of the arc extinction slit and also the length L of the valve arrester:

$$D - d \gtrsim 2 \int_0^{\tau} v(t)dt$$

$$H \gtrsim \frac{\lambda\left[U_S + \left(\frac{\partial L(t)\tau(t)}{\partial t}\right)_{t \to \tau}\right]}{\pi E(t) D},$$

where E is the strength of the electric field established in a helical arc and referred to the external edge of the arc (to the length of the leading edge of an arc that is extended in a radial direction); v(t) is a time function representing the radial speed of the arc; I(t) is the time function representing the follow current; $U_S$ is the amplitude of the voltage rated for the network under protection; and τ is the follow current extinction time.

The value of d determines the inductive resistance of the valve arrester at the moment when breakdown occurs. The value above taken together with the resistance of the nonlinear resistor determine the value of the follow current that arises at that moment. In a valve arrester with d=0, the leads running to the spark gaps and employed, for example, to connect shunts may be implemented in the body of the helical blade 2.

Arcing horns 4 connected serially with one another by means of conductors 5 are housed within the arc extinction slit on the surface of the central cylindrical member 3; the horns assume a helical space orientation and form the spark gaps of the arrester. For example, a spark gap with its arcing horns 4 appears to be in the fifth turn of the arc extinction slit, while the conductor 5 with the arcing horns 4 belonging to the adjacent spark gaps is seen in the third turn.

The arcing horns are designed to define the direction in which the supporting spots of arcs 6, produced in the spark gaps, are moved. The arcs 6 responsible for the follow current are moved in a radial direction within the helical cavity of the arc extinction slit under the action of force of electromagnetic interaction between the arcs and the magnetic field produced by the arrester.

After arcs 6 produced in the corresponding arc gaps have been extended to the ends of the arcing horns 4, there results their joining together and a single helical arc 7 is thus formed. For the sake of simplicity, FIG. 1 shows arcs 6, 7 present only at the fifth turn of the arc extinction slit. Note that by the length of the arcing horns is meant herein the distance between their ends and the surface of the central cylindrical member 5. Using the length and the height of the arcing horns, one can determine a time interval during which the arcing horns 4 and conductors 5 are held in contact with the supporting spots of the arcs 6 till the moment when these arcs join together.

There are input, 8, and output, 9, arcing horns intended for the displacement of the supporting spots of a single helical arc 7 during the course of its extension and movement in a radial direction. The arcing horns 8, 9 are located respectively at the beginning and the end of the arc extinction slit. The arcing horns 8 connect an arrester lead 10, while the arcing horns 9 connect an arrester lead 12, either in a direct way or via a nonlinear resistor 11. The input arcing horns 8 are connected to the conductor 5 of the first spark gap, while the output arcing horns 9 are connected to the conductor 8 of the last spark gap.

Figure 2:
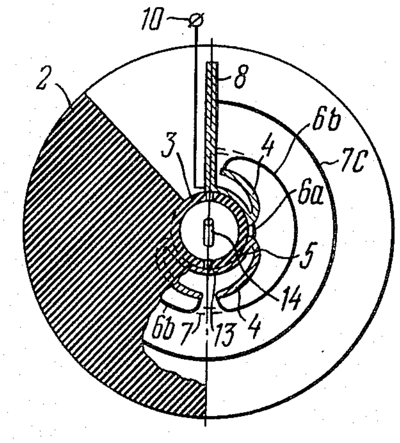
FIG. 2 is a sectional view on the line II—II of FIG. 1, according to the invention.

FIG. 2 shows the position of the arcs 6 corresponding to two successive points in time, "a" and "b". The position of the arc 6a corresponds to the moment when the arc 6 is struck at the start portions of the arcing horns 4. The position of the arc 6b corresponds to the moment when the arc 6 approaches the ends of the arcing horns 4; at that moment, one of the ends of the arc 6b is transferred (dashed lines in FIG. 2) on to the input arcing horns 8, while the other end of the arc 6b is joined together with analogous arc 6 available in the second spark gap (dashed lines in FIG. 2). As a result, a single helical arc 7 is formed. The position of the arc 7c corresponds to the point in time "c" when the helical arc 7 is extended, whereas one of the supporting spots of the arc 7c moves over the input arcing horns 8.

There are resistors within the hollow member 3 which are used to distribute the potential among the spark gaps, said resistors being connected in parallel with said spark gaps. Parallel connection of a shunt 14 to the first spark gap is established through holes 13 in the wall of the member 3 and via the conductors 5. The shunts for the remaining spark gaps (not shown in the drawing) are connected in analogous manner.

Figure 3:
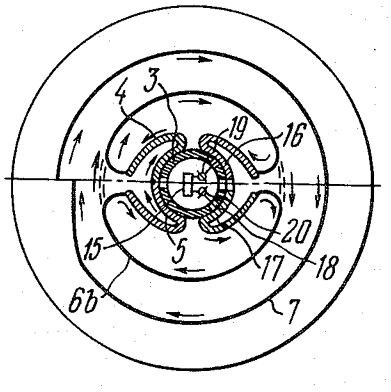
FIG. 3 is a sectional view on the line III—III of a valve arrester of FIG. 1, according to the invention.

FIG. 3 is a lateral sectional view of the valve arrester of the invention that shows how the adjacent spark gaps are interconnected by means of a nonlinear resistor 15, which is shunted during the production of a single helical arc 7. Leads 19, 20 located within the central member 3 are connected through holes 18 in the wall of the member 3 to sections 16, 17 respectively of one of the conductors 5 having a discontinuity. The nonlinear resistor 15 is connected the leads 19, 20.

With the arcs 6 in a position labelled 6b corresponding to the production of a single helical arc 7, there results a change in the path of the follow current through the arrester (there are arrows in FIG. 3 to show the path). Prior to joining the arcs 6 together, the follow current flows through the nonlinear resistor 15 connected to the leads 19, 20. After the formation of a single helical arc 7, no current flows through that resistor.

There may be a breakdown between the arcing horns 4 of the adjacent spark gaps or the sections 16, 17 of the conductor 5, said sections 16, 17 being interconnected via the nonlinear resistor 15, coupled to the leads 19, 20 prior to the formation of a single helical arc 7. To avoid that breakdown, a radial partition (not shown) in the helical cavity of the arc extinction slit may be provided. The partition installed between the ends of the sections 16, 17 and the adjacent arcing horns is made of an electric insulation material and has its height, as measured in a radial direction, exceeding the height of these arcing horns 4.

With the nonlinear resistor 15 located outside the member 3, the leads 19, 20 are preferably implemented as helical ones and are wound in opposition to the helical blade 2. As a result, the magnetic field of the arrester is increased. To provide for greater electric strength of the arrester, a cast electric insulation material may be filled in the cavity of the member 3.

The helical blade 2 of the arc extinction slit should be preferably implemented as a zigzag one in a radial direction. This protects the spark gaps from the radiation of the separated arc 7 responsible for the follow current. As a result, the recovery of the electric strength of the spark gaps is accelerated; the recovery process in this case means the rise of the breakdown voltage of the spark gaps up to its rating level.

The valve arrester of the invention operates in the following manner. With an overvoltage applied to the arrester, there results a breakdown in its spark gaps. This causes the follow current to pass therethrough along a helical line and a longitudinal magnetic field, as viewed with respect to the arrester axis, is established. In other words, a helical space orientation of the arcing horns 4 (FIG. 1) of the spark gaps and their conductors 5 provides these horns with an extra function which is usually performed by magnetic blow-out coils.

After the breakdown, arcs 6 (FIGS. 1, 2, 3) are struck in the spark gaps. As a result of interaction of the arc current with said longitudinal magnetic field the arcs 6 move in a radial (outward) and an azimuth direction and also lengthen. During the azimuth movement, on the ends of the arcs behave as if they recede from each other, when moving over the arcing horns 4. With the arcs 6 extended to the ends of the arcing horns 4, they are joined together so that a single helical arc 7 is formed. The time counted since the moment of breakdown till the joining of the arcs 6 depends on the length and height of the arcing horns 4; the two last values determine the length and resistance of the arcs 6 available at the moment of formation of a single arc 7.

The formation of the arc 7 causes a shunted condition of those nonlinear resistors 15 which are inserted between the adjacent spark gaps. In this condition, the arrester resistance decreases in a stepwise manner, with the result that the follow current, which passes from the network under protection to the arrester, increases. Thus the carrying capacity of the arrester is increased and the time required for the removal of the overvoltage from the network is decreased. Under these circumstances, the energy dissipated in the nonlinear resistors being shunted, is decreased, so that these resistors may have a smaller size.

By using certain arcing horns 4 of different length and height, one can select a specific shunt time for each of the nonlinear resistors 15; this provides for a nearly horizontal location of the corresponding steps of the volt-ampere characteristic curve of the arrester. Under these circumstances, the requirements imposed on the nonlinearity of the nonlinear resistors are not rigorous.

After a single helical arc 7 is formed, the conductors 7 and arcing horns 4 of all spark gaps are disconnected from the current circuit. Thus they are heated to a lesser extent and their service life is increased. The helical arc 7 (a plasma solenoid) tends to extend more and more in a radial direction and to lengthen concurrently. At a predetermined arc length, the voltage across the arrester exceeds the protected network voltage. As a result, the follow current drops down to zero and the arc 7 ceases. If the excessive discharge current existing in the network under protection is not diverted to the ground and the overvoltage is not removed, then the expansion of the arc 7 is continued and the voltage across the arrester increases until its spark gaps are subject to a breakdown again. Now the arcs 6 struck again in the spark gaps are used to shunt the arc 7 and the latter ceases. The operation cycle of the arrester is repeated.

Since the disclosed arrester does not require a space interval for the quenching of the follow current, it can be used in both d.c. and a.c. power networks, providing for greater protection of them from overvoltages due to a decrease in the surge level and duration.

The arc 7 extended in a radial direction has a helical shape with a helix of a small lead, a feature providing for more effective arc lengthening compared with flat-shape arcs which are produced in the known arc extinction chambers. Thus the disclosed valve arrester has a considerably increased arc extinction capacity and, consequently, simpler circuitry not provided in this case with magnetic blow-out coils which require protection-type bypass spark gaps. Since the arcing horns in the disclosed arrester are held in contact with the supporting spots of the arcs for lesser time, their erosive wear is decreased and the conductors are heated to a smaller extent.

The shunting of the nonlinear resistor 15 has the advantages as follows: greater carrying capacity of the valve arrester (higher degree of nonlinearity of its volt-ampere characteristic); and smaller amount of energy dissipated in that resistor due to the fact that its operation time is decreased.

What is claimed is:

1. A valve arrester comprising: arcing horns adapted to form spark gaps connected in series with one another;

at least one nonlinear resistor connected in series with said spark gaps;

arc extinction chambers in which said arcing horns are accommodated;

a single helical blade of an electric insulation material adapted to form the walls of said arc extinction chambers;

a central cylindrical member carrying said single helical blade;

said arcing horns located between the turns of said helical blade, assuming a helical space orientation, and affixed to the surface of the central cylindrical member, thereby providing for the formation of a single helical arc from the arcs produced in the spark gaps during the arrester breakdown, said arcs being joined together during their movement.

2. A valve arrester as claimed in claim 1, comprising: said nonlinear resistor inserted between adjacent ones of said spark gaps and shunted at the point in time when said single helical arc is produced.

* * * * *